(12) United States Patent
Gruber et al.

(10) Patent No.: US 10,817,235 B2
(45) Date of Patent: Oct. 27, 2020

(54) COMPLIANCE AUTOMATION FOR PRIVATE LABELED APPAREL AND TEXTILE PRODUCTS

(71) Applicant: Apliiq, Inc., Los Angeles, CA (US)

(72) Inventors: Ian Gruber, Cardiff by the Sea, CA (US); Emily Gruber, Los Angeles, CA (US); Loanthanh McDowell, San Marcos, CA (US); James J. Cunningham, Jr., San Diego, CA (US)

(73) Assignee: Apliiq, Inc., Los Angeles, CA (US)

( * ) Notice: Subject to any disclaimer, the term of this patent is extended or adjusted under 35 U.S.C. 154(b) by 0 days.

(21) Appl. No.: 16/749,942

(22) Filed: Jan. 22, 2020

(65) Prior Publication Data

US 2020/0233623 A1 Jul. 23, 2020

Related U.S. Application Data

(60) Provisional application No. 62/795,503, filed on Jan. 22, 2019.

(51) Int. Cl.
*G06F 3/12* (2006.01)
*B41J 3/407* (2006.01)
*G09F 3/14* (2006.01)
*B41J 2/21* (2006.01)
*G09F 3/02* (2006.01)

(52) U.S. Cl.
CPC ............ *G06F 3/1272* (2013.01); *B41J 2/21* (2013.01); *B41J 3/4078* (2013.01); *G06F 3/1205* (2013.01); *G09F 3/02* (2013.01); *G09F 3/14* (2013.01); *G09F 2003/0282* (2013.01)

(58) Field of Classification Search
USPC ............. 283/2–81; 358/1.1–3.29, 1.11–1.18, 358/498–305
See application file for complete search history.

(56) References Cited

U.S. PATENT DOCUMENTS

| | | | | |
|---|---|---|---|---|
| 2003/0004946 A1* | 1/2003 | VanDenAvond | ....... | G06Q 10/10 |
| 2009/0287992 A1* | 11/2009 | Bresolin | ............. | G07F 17/26 |
| | | | | 715/226 |
| 2012/0109777 A1* | 5/2012 | Lipsitz | ............ | G06Q 30/02 |
| | | | | 705/26.5 |
| 2013/0186950 A1* | 7/2013 | Keefe | ............ | G06F 19/326 |
| | | | | 235/375 |
| 2013/0208131 A1* | 8/2013 | Grewal | ............ | B41J 3/4075 |
| | | | | 348/207.2 |
| 2015/0156342 A1* | 6/2015 | Fries | ............ | H04N 1/00307 |
| | | | | 358/1.15 |
| 2015/0363376 A1* | 12/2015 | Anderson | ........ | G06F 3/04817 |
| | | | | 715/224 |
| 2017/0109575 A1* | 4/2017 | Martell | ............ | G06K 9/6201 |
| 2018/0072042 A1* | 3/2018 | Livingston | ............ | B41F 15/44 |
| 2019/0079649 A1* | 3/2019 | Hrastnik | ............ | G06F 40/242 |
| 2019/0095511 A1* | 3/2019 | Dhanasekaran | ........ | G06F 16/25 |
| 2019/0266923 A1* | 8/2019 | Dahlstrom | ............ | G09F 3/02 |

* cited by examiner

*Primary Examiner* — Marcellus J Augustin
(74) *Attorney, Agent, or Firm* — Gavrilovich, Dodd & Lindsey LLP

(57) ABSTRACT

The disclosure provides for automated compliance systems, and methods of use thereof, to modify and re-label textile products so that the products comply with client and governmental labeling requirements.

18 Claims, 2 Drawing Sheets

COMPLIANCE AUTOMATION FOR PRIVATE LABELED APPAREL AND TEXTILE PRODUCTS

CROSS REFERENCE TO RELATED APPLICATIONS

This application claims priority under 35 U.S.C. § 119 from Provisional Application Ser. No. 62/795,503, filed Jan. 22, 2019, the disclosures of which are incorporated herein by reference.

TECHNICAL FIELD

The disclosure provides for automated compliance systems, and methods of use thereof, to generate, modify or re-label textile products so that the products comply with client and/or governmental labeling requirements.

BACKGROUND

Apparel relabeling is federally governed in the United States (and other countries) and requires that each individual garment have labeling that contains brand artwork and mandated information including size, country of origin, material contents, and current requirements for care and wash instructions. While most apparel brands prefer their apparel products to be properly labeled with their brand mark, each apparel brand is responsible for complying with legally mandated information on their own.

SUMMARY

The disclosure provides for a compliance automation system, and methods of use thereof to modify and label products in a textile production line to comply with client and governmental labeling requirements. The compliance automation system of the disclosure comprises: a database containing up-to-date label information; a website server; a website browser; and one or more label printers; one or more sewing machines; one or more embroidery machines; a direct to garment printer or a screen printer; and/or transfer equipment (e.g., transfer paper, plastisol or aqueous based ink, heat press). The compliance automation system disclosed herein automates all compliance for apparel and textile labeling. By using the compliance automation system of the disclosure, apparel brands can cost-effectively relabel their textile products at small and large volumes with artwork for their own branded logo while still complying with mandated textile labeling regulations. For example, a customer can provide their brand label one time, which can be used to relabel hundreds or thousands of different apparel products, while the mandated compliance information is generated by the compliance automation system of the disclosure.

The compliance automation system of the disclosure also allows for personalization of the label at an individual level so as to differentiate the particular garment or piece of apparel from similar garments or like apparel. Accordingly, individuals in a group (e.g., members of a sports team) will be able to identify their garment or apparel based upon differences in the label, despite any similarities between the group's garments.

The compliance automation system of the disclosure further allows for serialization, such that every garment made with a particular artwork and style can be serialized, with every such garment having a unique identification code, for example 1 of 100, 2 of 100, etc. Such number adds to the perceived uniqueness and value of the garment. In addition, serialization can be a tool to assist in managing recalls if and when they become necessary, where the lots and batches can be tracked from its site of production through its distribution channel. Serialization can also be utilized to document copyrights and enforce infringements.

The disclosure provides a compliance automation system that modifies and re-labels textile products so that the products comply with client and/or governmental labeling requirements, comprising: (i) a website server in communication with one or more user devices via a browser, the website server providing a user interface via the browser or a graphical user interface (GUI) or command-line interface (CLI) at the one or more user devices and wherein the website server comprises a processor; (ii) a user interface, GUI or CLI comprising a plurality of user fields for entry of label information for collection by the website server; (iii) a database containing and storing user field data and textile label information for compliance with governmental labeling requirements for textile goods; (iv) a nontransitory computer readable medium comprising a rule engine comprising instructions that cause a computer to generate a label design containing required textile label information and user field data, optionally displaying the label design to the user through the user interface, GUI or CLI, optionally requiring an approval by the user of the label design; (v) a processing server in communication with the database that can receive a digital representation of the label design, wherein the processing server is operably linked to one or more of an automated label printer, an automated garment/textile printer, and/or an automated screen printer; and (vi) an automated label printer, an automated garment/textile printer, and/or an automated screen printer that is used to print and/or sew the design label into or onto a textile material. In one embodiment, the logo, file and/or text is personal to the user. In another embodiment, the plurality of fields include a serialization field that allows for creation of a limited release collection label. In yet another embodiment, the font, style or layout of the label design can be modified. In still another embodiment, the plurality of fields allows for selection of the length and/or width of the design label. In another embodiment, the plurality of fields allows for selection of the color of the design label. In another embodiment, the plurality of fields includes a logo, file, serialization and/or text information. In still another embodiment, the plurality of fields includes color selection of the label's ink. In one embodiment, the system can further comprise a database of order information of each product and label is stored to aid in compliance inquiries. In another embodiment, the plurality of fields comprises standard or customized label layouts. In yet another embodiment, an apparel size is included as a field of the plurality of fields. In still another embodiment, the labels are created on demand when an order is received from a brand maker and sent directly to an end customer. In one embodiment, the processing server is remotely connected to the automated label printer, the automated garment/textile printer, and/or the automated screen printer. In another embodiment, the design label is transmitted to a country of sale of the garment and optionally printed in a language of the country. In still another embodiment, the label is printed or attached to a material selected from the group consisting of slit edge satin, satin, nylon, cotton, rayon and polyester. In a further embodiment, the system further comprises removing an original manufacture label and the design label is sewn into the garment with a sewing machine, resulting in a compliant relabeled apparel product. In still another embodiment, the system further comprises removing an original manufacture label and the design label is printed directly into the garment, resulting in a compliant relabeled apparel product. In still a further embodiment, the system further comprises removing an original manufacture label and the design label is transferred to the garment using screen printing apparatus, plastisol ink, transfer sheets, and heat press, resulting in a compliant relabeled apparel product.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
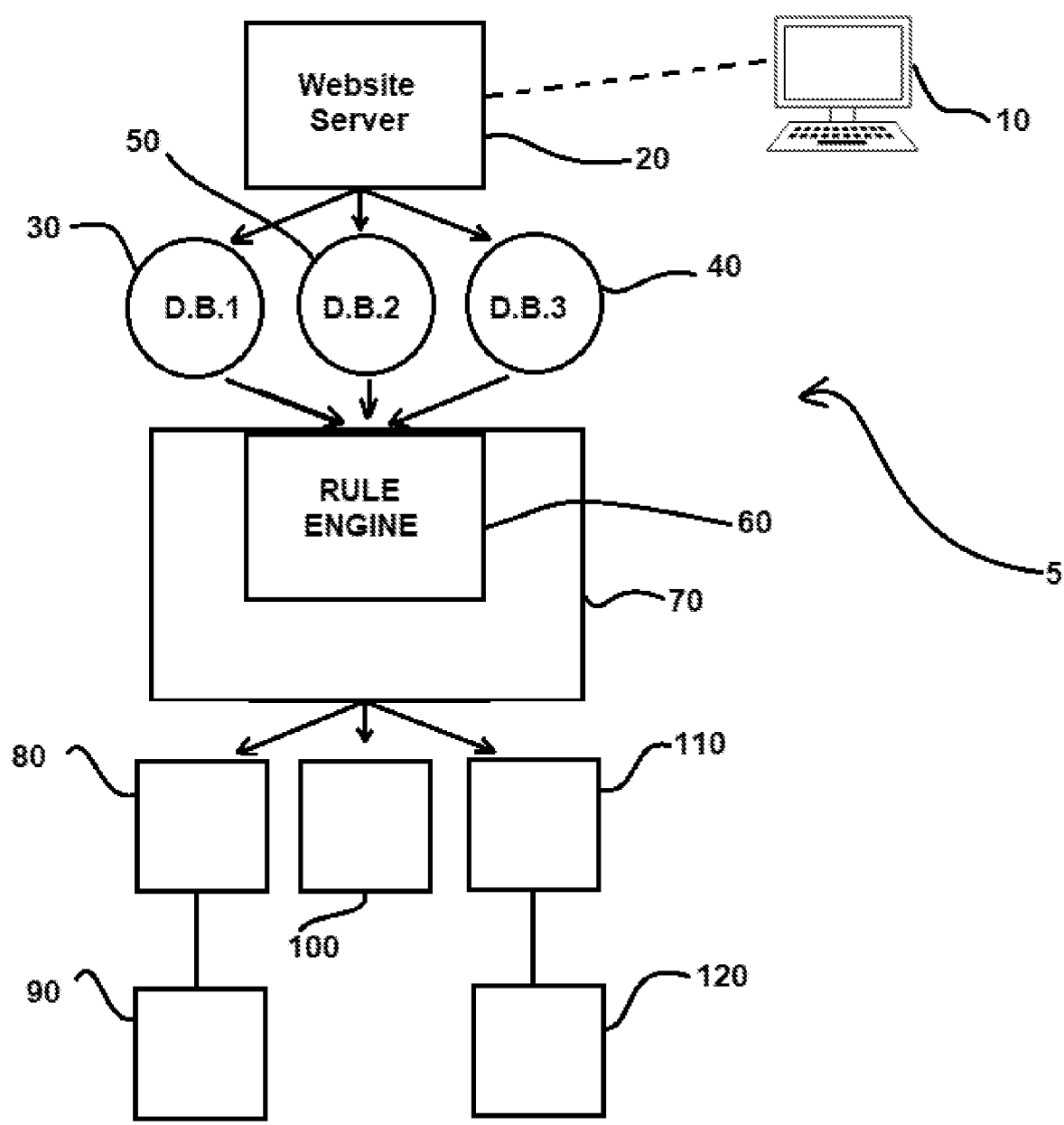
FIG. 1 shows a block diagram of a system of the disclosure.

As used herein and in the appended claims, the singular forms "a," "an," and "the" include plural referents unless the context clearly dictates otherwise. Thus, for example, reference to "a label" includes a plurality of such labels and reference to "the machine" includes reference to one or more machines and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Any methods and reagents similar or equivalent to those described herein can be used in the practice of the disclosed methods and compositions.

Apparel and garment manufacturers face certain challenges in labeling, relabeling and/or rebranding apparel products with their unique artwork and legally mandated information, namely a lack of automization and cost concerns. Such cost concerns, include costs (time and monetary) for apparel and garment manufacturers to create artwork for each product style and size combination. For example, to relabel 6 different styles of shirts in 4 different sizes, it is likely that 24 unique labels must be created. This requires that the customer create 24 pieces of unique artwork which is time consuming to do personally and expensive to have a graphic designer create. Moreover, some label companies have 1,000 piece minimum per design. Accordingly, 24,000 labels would be needed to relabel 6 shirt styles in 4 sizes additionally inflating the costs.

Apparel labeling and relabeling is Federally governed in the United States (and other countries) and requires that each individual garment have labeling that contains brand artwork and mandated information including size, country of origin, material contents, and current requirements for care and wash instructions (e.g., see Federal Regulations for Textile Labeling at [https://]www.ftc.gov/tips-advice/business-center/guidance/threading-your-way-through-labeling-requirements-under-textile; see also Federal Care Labeling Requirements at [https://]www.ftc.gov/tips-advice/business-center/guidance/clothes-captioning-complying-care-labeling-rule). While most apparel brands prefer their apparel products to be properly labeled with their brand mark, each apparel brand is responsible for complying with legally mandated information on their own. Complying with governmental and regional requirements, makes label design creation challenging, as apparel and garment manufactures may not know the legally mandated information for each blank. For example, a single apparel style maybe manufactured in 2 different countries so apparel and garment manufactures may not know which country of origin to include in their label design.

Apparel and garment manufactures must reach or exceed minimum ordering quantities for each unique label. This requires capital upfront to purchase labels, but in many cases apparel or garment manufactures don't know how many labels they will need as they only have sales projections. They are forced to take financial risks to bring their private labeled products to market.

Once they have purchased the labels, apparel and garment manufactures are required to find a manufacturing partner to remove the existing product labels and sew, print, or transfer the labels into the garments. This adds additional time, cost, and logistical challenges to bring private labels products to market.

Thus, many businesses in the apparel industry are unaware of regulations and the changes to regulations, lack the information required to comply, do not have the time or the resources to create the required information for each product they want to relabel, or do not have the volume of manufacturing throughput to make complying with regulations cost effective.

In addition, with the availability of the internet, additional features not available due to limits on practicality and cost can now be realized. For example, with the advent of ordering clothing online especially with dropshipping, individuals and businesses who want unique products related to size, color and art on their clothing can now take advantage of these new technologies. However, cost effective automation tools for compliantly branding, personalizing, or serializing the label of the clothing are not available.

"Dropshipping" as used herein, refers to an order fulfillment method that does not require a business to keep products in stock. Instead, the store sells the product, and passes on the sales order to a third-party supplier, who then ships the order to the customer.

FIG. 1 is a block diagram illustrating the computer-device system of the disclosure. Computer 10 comprises an interface for interacting with website server 20. Computer 10 can comprise an intranet or internet connection to website server 20. The computer 10 can be a tablet, smart phone, personal computer, or other computer interface that can receive and display information from the website server 20, as well as receive commands/input. The computer 10 may be understood as a logical apparatus that can read instructions from media and/or a network port, which can optionally be connected to website server 20 having fixed media. The computer 10 comprises a processor (e.g., computer processing unit (CPU)) or processors (e.g., CPU and graphics processing unit (GPU), motherboard or circuit board, internal memory (e.g., RAM and/or ROM), and/or external memory device (e.g., solid-state drive, hard disk drive, etc.), optional peripheral devices such as keyboard and/or mouse and optional monitor). Data communication can be achieved through communication medium to a website server 20 at a local or a remote location. The communication medium can include any means of transmitting and/or receiving data. For example, the communication medium can be a network connection, a wireless connection or an internet connection. Such a connection can provide for communication over the World Wide Web.

The website server 20 may be a distinct computer or may be a system within a central server that comprises other components. The website server 20 communicates with a plurality of databases (D.B.'s) 30, 40 and 50. The databases 30, 40 and 50 include data comprising product's material contents and care instructions (e.g., DB1 30), user order for labeling (e.g., DB2 40) and user branding and additional label specification (DB3, 50). A rule engine 60 (which may be present on a second server 70) retrieves order, label and branding (e.g., design and layout) information and processes final compliant labels to be affixed to products. A processing server, e.g., 70, stores final label artwork that can be transferred to a garment, such as by printing, sewing, stitching, embroidering, or woven on the garment. The rule engine 60 and/or processing server 70 outputs the label design to one or more of a label printer 80, garment/textile printer 100 and/or screen printer 110. The label printer 80 can be linked to an automated sewing machine system 90. In addition or alternatively, the screen printer 110 can provide screen print labels to a heat press 120 for application to a product textile.

In operation, a user provides through the website server 20 information regarding the particular textile material (e.g., cotton), size of the textile (e.g., small medium large) and the server enters the information into the label database 40. The database(s) 30, 40 and 50 then collate the information in the rule engine 60 to provide a label comprising the source material location (e.g., U.S.A.), the type of material (e.g., cotton), the care instructions (e.g., machine wash cold, tumble dry low, do not bleach, low iron, do not dry clean), and any other pertinent information (e.g., logo design owner, brand name, personalized information etc.). The rule engine 60 then outputs this information to an automated label maker 80 (optionally associated with a sewing machine 90), an automated direct garment/textile printer 100 and/or an automated screen printer 110. One advantage of the system is that the databases are easily updated and available to users.

Those skilled in the art will appreciate that the system concept described above can be applied to many fields of interest, including, for example, clothing; clothing accessories (e.g., hats, beanies, ties, socks, fanny packs, bags, etc.); shoes; home goods such as wallpaper, curtains, blinds, sheets, blankets, pillows and throws, mattresses, box springs, hard goods such as furniture and the like. Moreover, it will be recognized that the methods and systems of the disclosure are applicable to a wide variety of materials, including but not limited to paper, plastic, leather, rubber, various fabric (nylon, cotton, polyester etc.) and other materials. Thus, references to textiles is not intended to be limiting as to the types of materials that can be cut, labeled and/or assembled.

Automated garment/textile production systems are known. For example, a garment/textile printer can be embodied as any suitable type of printer for printing on textile fabrics or other materials. The garment/textile printer may be embodied, for example, as a digital garment/textile printer, digital garment printer, or direct-to-garment printer. The garment/textile printer can use specialized inkjet technologies, for example, to apply ink directly on fabrics. The garment/textile printer can apply water-based, acid, reactive, or other types of inks depending upon the type of fabric or other material being printed upon. Garment/textile printers can print on fabrics that are woven, non-woven, knitted, netted, technical, etc., without limitation. The garment/textile printer can also print on various types of materials, such as paper, plastic, leather, rubber, and other materials. In some cases, the garment/textile printer can be embodied as a duplex-type printer capable of printing on both sides of a textile sheet or other material. As noted above, the garment/textile printer receives instructions from the rule engine for printing a specific label for the garment/textile goods.

In some embodiment, a garment/textile dryer can be used for drying ink printed on textile fabrics or other materials. The garment/textile dryer can include adjustable infrared or heat panels, for example, to dry or cure ink applied by the garment/textile printer, as needed. The operation of the garment/textile dryer can be controlled by the rule engine 60, the processing server 70, and/or manually.

In another embodiment, where the rule engine 60 outputs label instructions to a label printer 80, a sewing attendant or automated sewing machine 90 can sew the label to a panel of textile material. For example, at a sewing station, an attendant and/or automated sewing machine can match and assemble each label with the associated textile material.

A textile production line can include the label system 5 of the disclosure at a desired point in the production line. The production line can include one or more conveyors, totes, sewing or assembly stations, and associated drive and control systems, wherein the label is provided at an appropriate point in the production line using any of 80, 90, 100, 110 and/or 120 as an operable system associated with system 5.

The disclosure also provides a private label automation system for apparel products where a user can provide a logo by uploading an image or other file type or typing, into their internet browser or digital transfer mechanism through a web server to a database, where required and optional label information is stored in a database along with customer order data or offers for orders and required apparel product labeling information, which is then programmatically merged into a final label design by a business rule engine, which is ultimately printed directly into garments with direct to garment printer or screen printer, printed with a label printer then sewn into garments with a sewing machine, or printed with screen printer then transferred to garments with the end result of creating a private labeled apparel or accessory product that is compliant with legally mandated information.

For example, a user can simply provide the user-desired logo in a .png or .jpg via computer 10 which is communicated to website server 20. The user can either identify a pre-existing textile product to be associated with the user-desired logo, or provide a new textile product including material composition. In one embodiment, the user-desired logo is provided in a desired pixel size (e.g., 300 pixels by 300 pixels). The rule engine 60 then obtains one or more pieces of information from databases 30, 40 and 50 including, e.g., country of manufacture, material care instructions and the like (automatically generated information) that are associated with the pre-existing textile product and then outputs a label design including the user-desired logo accompanied by the one or more pieces of information from the databases. In one embodiment, a user can see an online mockup of what their finished label will look like. In another embodiment, a user can additionally request serialization of labels within an order to create a limited release collection. In still another embodiment a user can additionally request serialization of their labels over the course of their lifetime, for example, indicating that this particular garment is the 10,421 garment produced. In still another embodiment, a user can additionally change font or style or layout of required textile information to better match their brand. In another embodiment, a user can select the material of their label. In yet another embodiment, a user can select the length and width of their label. In still another embodiment, a user can select the color of their label. In yet still another embodiment, a user can select the ink or thread color for their printing or label. In another embodiment, a user can provide additional text to be merged into the label. In yet another embodiment, order information of each product and label is stored to aid in compliance inquiries. In still another embodiment, a manufacturing operator can easily override the country of origin variable based on the garment to be relabeled. In yet another embodiment, different layouts of required information can be selected by customer. In yet another embodiment, apparel size is included as part of automatically generated information. In still another embodiment, labels are created on demand when an order is received from a brand company and sent directly to its end customer (dropshipping). In still another or further embodiment of any of the foregoing, the mandated label information is automatically translated to the country of sale of the garment, for example countries within the EU, require label text or label information to be in their native language. In still another embodiment, the label is printed onto material such as slit edge satin, satin, nylon, or polyester, then the attached manufacturer's tag is removed, and the branded tag is sewn into the garment with a sewing machine, resulting in a compliant relabeled apparel product. In yet another embodiment, the manufacturer's tag is removed and the rebranded label is printed directly into the garment, resulting in a compliant relabeled apparel product. In another embodiment, the manufacturer's tag is removed and the rebranded label is transferred to the garment using screen printing apparatus, plastisol ink, transfer sheets, and heat press, resulting in a compliant relabeled apparel product.

In another embodiment, the label automation system of the disclosure is associated with an on-line store. For example, The label automation system can be linked to a further computer system having a computer processor, a database associated with said processor; software adapted to run on said processor to retrieve data to and from said database; a user interface operatively associated with said software and processor for enabling first users to select subsets of product components offered via said computer system to create online stores, said online stores enabling second users to create custom products using the subset of product components selected for that store; said database storing data representative of said online stores and the subset of product components associated with each online store for use by said computer system in operating and maintaining the online stores and the label automation system configured to label products purchased from each online store.

In another embodiment, the disclosure provides a method for selling customized products and creating customized online stores comprising providing a network accessible computer system having one or more databases associated therewith; enabling first users to access said computer system via said network in order to perform at least one of: (a) customizing products offered via the computer system; (b) choosing a subset of product components offered via the computer system; storing data in said database indicative of at least one of customized products designed and subsets of product components chosen by said first users; enabling said first users to choose at least one of: (i) purchasing their customized products, (ii) creating online stores, each offering a respective one of said subsets of product components to allow others to customize products using the respective subset of product components; storing data in said database representative of online stores created; generating labels using the label automation system of the disclosure; and allowing said online stores to be accessed by others via said network for the design and purchase of customized products.

Figure 2:
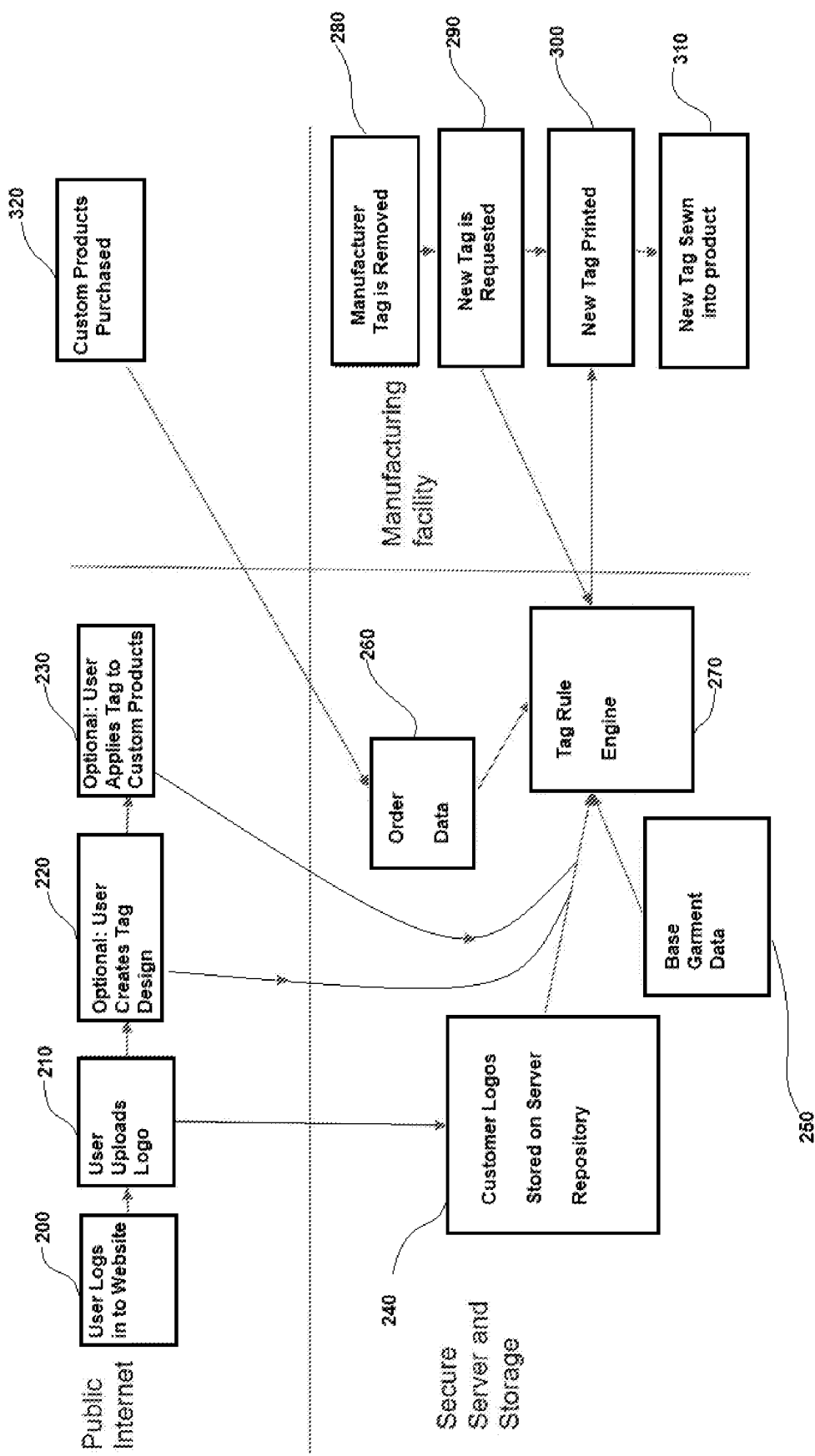
FIG. 2 provides a flow diagram outlining a process of the disclosure.

The system and process is general provided in FIG. 2, wherein box 200 is where a user logs into the secure server's website. A user interface is provided to the user to allow the user to provide information regarding names, billing address, delivery address and logo information. At 210, the user can upload a desired logo to be used on a garment. This logo information is transmitted to the server and stored in a logo repository 240. Optionally, the user may further design a garment tag containing the user's logo 220 and optionally provide a location on a garment where the tag/logo is to be attached or located 230. In some instances, the user may design a custom garment 320 and integrate the user logo and/or tag onto the custom garment. Upon receipt of the user logo 240, the automation system of the disclosure draws upon information stored in an order data system 260 and a base garment data system 250. Order data system 260 will include information related to the number and types of garments being order by a user. The base garment data system 250 will include data regarding the type of garment (e.g., material, manufacturer, location of manufacture etc.). A tag rule engine 270 then collects and collates that data from 240 and 260 to generate a virtual tag containing the garment data and user logo. The virtual tag information is transmitted to a manufacturing system or location where a garment to be tagged is identified, any preexisting tag is removed 280, the virtual tag is requested 290. The tag is then (i) printed or sewn directly onto the garment or (ii) is printed or sewn onto a physical tag 300, and then the new tag is sewn into/onto the garment 310.

Certain embodiments of the invention have been described. It will be understood that various modifications may be made without departing from the spirit and scope of the invention. Other embodiments are within the scope of the following claims.

What is claimed is:

1. A compliance automation system that, labels, modifies and/or re-labels textile products so that the products comply with client and/or governmental labeling requirements, comprising:
   (i) a website server in communication with one or more user devices via a browser, the website server providing a user interface via the browser or a graphical user interface (GUI) or command-line interface (CLI) at the one or more user devices and wherein the website server comprises a processor;
   (ii) a user interface, GUI or CLI comprising a plurality of user fields for entry of label information for collection by the website server;
   (iii) a database containing and storing user field data and textile label information for compliance with governmental labeling requirements for textile goods;
   (iv) a nontransitory computer readable medium comprising a rule engine comprising instructions that cause a computer to generate a label design containing required textile label information and user field data, optionally displaying the label design to the user through the user interface, GUI or CLI, optionally requiring an approval by the user of the label design;

(v) a processing server in communication with the database that can receive a digital representation of the label design, wherein the processing server is operably linked to one or more of an automated label printer, an automated garment/textile printer, and/or an automated screen printer; and (vi) an automated label printer, an automated garment/textile printer, and/or an automated screen printer that is used to print and/or sew the design label into or onto a textile material.

2. The system of claim 1, wherein the logo, file and/or text is personal to the user.

3. The system of claim 1, wherein the plurality of fields include a serialization field that allows for creation of a limited release collection label.

4. The system of claim 1, wherein font, style or layout of the label design can be modified.

5. The system of claim 1, wherein the plurality of fields allows for selection of the length and/or width of the design label.

6. The system of claim 1, wherein the plurality of fields allows for selection of the color of the design label.

7. The system of claim 1, wherein the plurality of fields includes a logo, file, serialization and/or text information.

8. The system of claim 1, wherein the plurality of fields includes color selection of the label's ink.

9. The system of claim 1, further comprising a database of order information of each product and label is stored to aid in compliance inquiries.

10. The system of claim 1, wherein the plurality of fields comprises standard or customized label layouts.

11. The system of claim 1, wherein an apparel size is included as a field of the plurality of fields.

12. The system of claim 1, wherein the labels are created on demand when an order is received from a brand maker and sent directly to an end customer.

13. The system of claim 1, wherein the processing server is remotely connected to the automated label printer, the automated garment/textile printer, and/or the automated screen printer.

14. The system of claim 13, wherein the design label is transmitted to a country of sale of the garment and optionally printed in a language of the country.

15. The system of claim 1, wherein the label is printed or attached to a material selected from the group consisting of slit edge satin, satin, nylon, cotton, rayon and polyester.

16. The system of claim 15, further comprising removing an original manufacture label and the design label is sewn into the garment with a sewing machine, resulting in a compliant relabeled apparel product.

17. The system of claim 15, further comprising removing an original manufacture label and the design label is printed directly into the garment, resulting in a compliant relabeled apparel product.

18. The system of claim 15, further comprising removing an original manufacture label and the design label is transferred to the garment using screen printing apparatus, plastisol ink, transfer sheets, and heat press, resulting in a compliant relabeled apparel product.

* * * * *